United States Patent
Collins

(10) Patent No.: US 10,450,061 B2
(45) Date of Patent: Oct. 22, 2019

(54) SERVO ACTUATORS

(71) Applicant: DOMIN FLUID POWER LIMITED, Blagdon, Bristol (GB)

(72) Inventor: Andrew John Collins, Somerset (GB)

(73) Assignee: DOMIN FLUID POWER LIMITED, Bristol (GB)

( * ) Notice: Subject to any disclaimer, the term of this patent is extended or adjusted under 35 U.S.C. 154(b) by 237 days.

(21) Appl. No.: 15/524,387

(22) PCT Filed: Nov. 13, 2015

(86) PCT No.: PCT/GB2015/053463
§ 371 (c)(1),
(2) Date: May 4, 2017

(87) PCT Pub. No.: WO2016/075491
PCT Pub. Date: May 19, 2016

(65) Prior Publication Data
US 2018/0281940 A1    Oct. 4, 2018

(30) Foreign Application Priority Data

Nov. 14, 2014 (GB) .................................. 1420291.5

(51) Int. Cl.
*F15B 18/00* (2006.01)
*B64C 27/64* (2006.01)
(Continued)

(52) U.S. Cl.
CPC .......... *B64C 27/64* (2013.01); *F15B 13/0406* (2013.01); *F15B 18/00* (2013.01); *F15B 9/09* (2013.01); *F15B 2211/8757* (2013.01)

(58) Field of Classification Search
CPC .... F15B 9/09; F15B 13/0406; F15B 15/1404; F15B 18/00; F15B 20/004; F15B 20/008
(Continued)

(56) References Cited

U.S. PATENT DOCUMENTS 3,529,514 A * 9/1970 Quenneville ........... F15B 18/00
137/596
3,933,176 A  1/1976 Wheeler
(Continued)

FOREIGN PATENT DOCUMENTS

GB    2 510 498 A    8/2014
GB    2515055        12/2014

OTHER PUBLICATIONS

Examination Report under Section 18(3) issued in GB1420291.5 dated May 6, 2015.
(Continued)

*Primary Examiner* — Michael Leslie
(74) *Attorney, Agent, or Firm* — Charles C. Achkar; Ostrolenk Faber LLP.

(57) ABSTRACT

A servo actuator (1) comprises an actuator housing (4); an actuator member (2) located within the actuator housing (4) and at least one spool (8) located in a cavity (6) formed within the actuator housing (4). The housing (4) also comprises a first set of internal ports including an inlet port (P), an outlet port (T) and a pair of control ports (S1, S2), the inlet port (P) being arranged for connection to a first pressurised supply and a second set of internal ports comprising an inlet port (P'), an outlet port (T') and a pair of control ports (S1', S2'), the inlet port (P') being arranged for connection to a second pressurised supply. In use, movement of the spool (8) alters the flow path of fluid through the first and second set of internal ports to control the movement of the actuator member (2).

15 Claims, 5 Drawing Sheets

(51) Int. Cl.
*F15B 13/04* (2006.01)
*F15B 9/09* (2006.01)

(58) Field of Classification Search
USPC .......................................................... 91/509
See application file for complete search history.

(56) References Cited

U.S. PATENT DOCUMENTS

| | | | |
|---|---|---|---|
| 4,335,745 | A | 6/1982 | Bouveret et al. |
| 5,128,908 | A | 7/1992 | Reust |
| 5,899,226 | A * | 5/1999 | Devaud .................... F15B 13/04 |
| | | | 137/554 |
| 6,269,733 | B1 | 8/2001 | Reust |
| 7,882,778 | B2 * | 2/2011 | Fenny ..................... B64C 13/42 |
| | | | 91/509 |
| 8,960,228 | B2 * | 2/2015 | Hervieux ............ F15B 13/0406 |
| | | | 91/509 |
| 2013/0075642 | A1 * | 3/2013 | Hervieux ............ F15B 13/0406 |
| | | | 251/304 |
| 2014/0076154 | A1 | 3/2014 | Frick et al. |

OTHER PUBLICATIONS

Examination Report under Section 18(3) issued in GB1420291.5 dated Jun. 29, 2015.
International Search Report and the Written Opinion of the International Searching Authority issued in PCT/GB2015/053463 dated Feb. 5, 2016.

* cited by examiner

SERVO ACTUATORS

CROSS REFERENCE TO RELATED APPLICATIONS

This application is a § 371 National Phase Application of International Application No. PCT/GB2015/053463 filed Nov. 13, 2015, which claims the benefit of Great Britain Patent Application No. 1420291.5, filed on Nov. 14, 2014, the disclosure of which is hereby fully incorporated herein by reference.

FIELD OF THE INVENTION

The present invention concerns servo actuators, in particular servo actuators for use in aerospace applications. The invention also concerns an aircraft including such a servo actuator, a method of controlling the actuator of such a servo actuator, and controlling the movement of a flight control surface using such a servo actuator.

BACKGROUND OF THE INVENTION

Servo actuators are used in a wide variety of industries to produce a controlled movement in response to an input signal. Servo actuators are typically used in industries where precise control of the output motion is required. For example, in the aerospace industry, servo actuators may be used to move the control surfaces of an aircraft.

A servo actuator includes a servo valve and an actuator. The servo valve alters the flow of a fluid through the servo actuator in order to control the position, velocity, acceleration or force generated by the actuator. Typical actuators include hydraulic or pneumatic cylinders or motors.

A servo valve typically comprises a moving element (spool) and a fixed element (sleeve). The relative movement of these two elements controls the flow of fluid through the valve in response to a mechanical or electrical input signal.

Additive manufacture, also known as 3D printing, is a term applied to processes whereby three-dimensional articles are manufactured by building up successive layers of material in different shapes. This is in contrast to traditional manufacturing techniques (known as subtractive manufacturing) such as milling or boring in which material is removed in order to create the final form of an article. The flexibility offered by additive manufacturing techniques allows the design of servo actuators to be approached differently. Redesigning a servo actuator taking into account the possibilities offered by flexible manufacturing has resulted in an improved design which overcomes a number of longstanding issues associated with servo actuators.

Servo actuators that are used in safety-critical applications, for example aerospace applications, must meet stringent safety criteria.

One mode of servo actuator failure is a "supply-failure" wherein the supply of pressurised fluid to or within the actuator is interrupted. Generally, in safety-critical applications servo actuators must continue to function in the case of a supply-failure. One way in which this can be achieved is to introduce redundancy into the control of the servo actuator. As part of this solution a second, independent, pressurised supply is provided. The second pressurised supply is connected to the actuator via a completely separate hydraulic system (i.e. a separate servo valve and flow galleries) in order to reduce the risk that failure of the first pressurised supply prevents the servo actuator from functioning. Having two hydraulic systems to control the same actuator may increase the size and weight of the servo actuator assembly.

Another way in which a servo actuator may fail is if the spool jams, for example as a result of contaminants in the fluid or wear of internal components. This mode of failure may be referred to as a "spool-jam". In many safety critical applications the design of the servo actuator must ensure that pressurised fluid can be redirected in the case of a spool-jam. Such an escape mechanism is required to avoid a build-up of high pressure fluid within the servo actuator which may cause the actuator to run out of control or jam in position. If the pressurised fluid of the first hydraulic system can escape to return following a spool-jam, the second hydraulic system may continue controlling the actuator. Typically, this is achieved by providing an independently operated bypass valve at a point in the hydraulic system. Including such bypass valves may increase the cost, complexity and size of the servo actuator assembly. To reduce the risk of a failure in one hydraulic system impacting on another each hydraulic system is housed separately. Maintaining two (or more) completely separate hydraulic systems in this manner may increase the size and weight of the servo actuator.

A further requirement for safety critical systems is that any structural failure of the servo actuator should be apparent from a visual inspection. Typically this means ensuring that any crack in the actuator housing will propagate such that fluid escapes to atmosphere from the valve (i.e. fluid will drip from the valve in the case of a failure). Housing each hydraulic system separately facilitates the design of servo actuators where fluid escapes to atmosphere in case of a failure.

Many of the servo actuators available, particularly for safety-critical applications have complex mechanisms designed to reduce the risk of in-service failure. Such complex mechanisms may increase manufacturing and through-life maintenance costs. It would therefore be advantageous to produce a simpler servo actuator, particularly for use in safety-critical applications.

Many servo actuators are used in applications where space is limited. Typically, reducing the size of the servo actuator leads to a reduction in the output force that can be generated by the servo actuator. Consequently, it would be advantageous to produce a servo actuator that has an increased flow rate in comparison to its size and weight. In particular, it would be advantageous to produce a servo actuator suitable for use in safety-critical applications with a reduced size and weight.

SUMMARY OF THE INVENTION

According to a first aspect of the invention, there is provided a servo actuator comprising: an actuator housing; an actuator member located at least partially within the actuator housing; at least one spool located in a cavity formed within the actuator housing; a first set of internal ports formed within the actuator housing, the first set of internal ports including a first inlet port, a first outlet port and a first pair of control ports, the first inlet port being arranged for connection to a first pressurised supply;

a second set of internal ports formed within the actuator housing, the second set of ports comprising a second inlet port, a second outlet port and a second pair of control ports, the second inlet port being arranged for connection to a second pressurised supply; and wherein, in use, movement of the at least one spool alters the flow path of fluid through the first and second set of internal ports.

Providing the first and second set of internal ports and the at least one spool within the housing of the servo actuator may facilitate more compact servo actuator designs. Providing a first set of internal ports associated with a first pressurised supply, and a second set of internal ports associated with a second pressurised supply may reduce the risk of the servo valve failing in service.

The actuator housing may include a plurality of flow galleries, for example curvilinear flow galleries. Each flow gallery may be defined by an inner surface of the actuator housing. The actuator housing may comprise an inner surface which defines the cavity in which the at least one spool is located. Each internal port may be formed in the inner surface of the actuator housing that defines the cavity. It may be that the actuator housing, cavity, and internal ports are provided by a single component. It may be that the actuator housing, cavity, and internal ports are integrally formed. Thus, the actuator housing may be the manifold for the servo valve, as well as containing at least part of the actuator member.

It may be that the actuator member is mounted for movement between a first output position and a second output position.

The actuator housing may include at least two actuator chambers. It may be that fluid flows between the first set of internal ports and the first actuator chamber and between the second set of internal ports and the second actuator chamber. Each actuator chamber may comprise two regions. Fluid flowing into the first actuator chamber region may cause the actuator member to move in the first output direction. Fluid flowing into the second actuator chamber region may cause the actuator member to move in the second output direction. The actuator housing and actuator chambers may be provided in a single component. Thus, it may be that the actuator housing, cavity, internal ports, and actuator chambers are all formed as part of a single component. The actuator chambers may be integrally formed with the fluid manifold.

The actuator housing may include a center gland. The first set of internal ports and the second set of internal ports may be formed within the center gland. The at least one spool may be located in a cavity formed in the center gland. Locating the cavity, internal ports and spool in the center gland reduces the risk of thermal expansion impacting on the operation of the servo actuator and/or may facilitate more compact servo actuator designs. The actuator housing may include two jack bodies. The actuator member may be located at least partially within the jack bodies. Each actuator chamber may be formed in a jack body. The center gland may be located between the two jack bodies. The servo actuator may be a tandem actuator.

Each internal port may be in fluid communication with a cavity in which the at least one spool is located. Each internal port may be categorised according to its function. Categories of internal port may include inlet ports, outlet ports, control ports and release ports. Fluid may flow into the cavity via an inlet port. Fluid may flow out of the cavity via an outlet port. Fluid may flow into the cavity via a control port. Fluid may flow out of the cavity via a control port. Thus, a control port may act as a fluid inlet and as a fluid outlet. A control port may act as a fluid inlet or a fluid outlet depending on the position of the spool. Fluid flowing out of the cavity via a first control port may cause the actuator member to move in a first output direction. Fluid flowing out of the cavity via a second control port may cause the actuator member to move in a second output direction. The second output direction may be opposite to the first output direction.

A control port may be categorised as an A-control port if fluid flowing out of the cavity via the port causes the actuator member to move in the first output direction. A control port may be categorised as a B-control port if fluid flowing out of the cavity causes the actuator member to move in the second output direction. Each pair of control ports may include an A-control port and a B-control port. An inlet port may be in fluid communication with an actuator chamber via the cavity and a control port. An outlet port may be in fluid communication with an actuator chamber via the cavity and a control port. Fluid may flow out of the cavity via a release port following a spool-jam. Thus, a release port may function as a fluid outlet in the case of a spool-jam. The servo actuator may include one or more release ports in addition to the ports of the first and/or second set. It will be appreciated that fluid may also flow out of the cavity via an outlet port in the case of a spool-jam.

The first and second set of internal ports may each include further ports. Each set may include further inlet ports, outlet ports and control ports. For example, the first and second set may each include an inlet port, two outlet ports and a pair of control ports.

The first and second set may each include two inlet ports, two outlet ports and two pairs of control ports. The first inlet port may be located opposite the second inlet port around the circumference of the cavity. Including two inlet ports located on opposite sides of the spool in each set may allow the forces generated by incoming high-pressure fluid to counteract each other to some extent and thereby improve the force balance on the spool.

The at least one spool may be mounted for movement between a first position in which the spool prevents the flow of fluid from an inlet port to either of the corresponding control ports and a second position in which fluid may flow from the inlet port to one control port, for example the A-control port, of a control port pair via the cavity. It may be that, when the spool is in the second position, fluid may flow from the other control port, for example the B-control port, of a control port pair to an outlet port. Thus, movement of the spool from the first position to the second position may permit the flow of fluid to one of the actuator chamber regions, for example the first actuator chamber region, and thereby cause the actuator member to move. Movement of the spool from the first position to the second position may also permit the flow of fluid out of the other actuator chamber region, for example the second actuator chamber region.

The at least one spool may be mounted for movement between the first position and a third position in which fluid may flow from the inlet port to the other control port, for example the B-control port, of a control port pair. Thus, in the third position the connection between the inlet port, outlet port and the two control ports of a control port pair may be swapped. For example, the control port which is in fluid communication with an inlet port when the spool is in the second position may be in fluid communication with an outlet port when the spool is in the third position. Thus, moving the spool between the second position and the third position may change the direction of movement of the actuator member.

The at least one spool may include a plurality of lands. When the at least one spool is in the first position the lands of the spool may block the flow of fluid between the internal ports of the first and/or second set. The at least one spool may include one or more channels. When the at least one spool is not in the first position, fluid may flow between the internal ports of a set via the one or more channels.

It may be that the at least one spool is mounted for axial rotation. Mounting the spool for axial rotation may facilitate more compact servo actuator designs. Each spool may be mounted for rotation about the longitudinal axis of the spool.

The at least one spool is located within a cavity formed within the housing of the actuator. In the case that the servo actuator includes more than one spool, each spool may be located in a different cavity formed within the actuator housing. Alternatively or additionally, two or more spools may be located in the same cavity. Locating two or more spools in the same cavity may facilitate more compact servo valve designs and/or simplify the manufacturing process. Each spool may be associated with a different set of internal ports. That is to say, each spool may control the flow of fluid between the internal ports of a different set.

The servo actuator may include a first spool and a second spool. The first spool and the second spool may be located in different cavities formed within the actuator housing. The first spool and the second spool may be located in the same cavity. The first and second spool may be coaxially located within the same cavity. It may be that movement of the first spool alters the flow of fluid through the first set of internal ports. It may be that movement of the second spool alters the flow of fluid through the second set of internal ports.

The servo actuator may include further sets of internal ports. Each further set of internal ports may include a further inlet port, a further outlet port and a further pair of control ports. Each further set of internal ports may include further internal ports.

The servo actuator may include further spools. Each further spool may be located in a cavity formed within the actuator housing. It may be that movement of each further spool alters the flow of fluid through a further set of internal ports.

It may be that at least one spool is mounted for independent movement with respect to another spool. Independent movement of at least one spool allows that spool to continue to function in the event of a spool-jam by another spool. Thus, independent movement of the spools may reduce the risk of failure of the servo actuator in service. Each of the first and second spools may be mounted for independent movement with respect to the other of the first and second spools. It may be that each spool is mounted for independent movement with respect to every other spool.

Alternatively, it may be that the first and second spools are mounted to move together. That is to say, the spools may be mounted to prevent independent movement of one spool with respect to another. Fixing the position of the first and second spools relative to each other may facilitate simpler designs of servo actuator. For example, a single drive train may be used to move both spools and/or a single feedback system may be used to control the position of both spools.

The first set of internal ports and their associated flow paths may be referred to as a first hydraulic system. The second set of internal ports and their associated flow paths may be referred to as a second hydraulic system. The actuator housing, for example the center gland (if present), may be arranged such that there is no credible crack propagation path through the housing between the first and second hydraulic systems. Thus, the actuator housing, particularly the center gland (if present), may be arranged to provide a visible indication of failure in the case of a structural failure. The actuator housing may include one or more air gaps. Each air gap may be arranged to provide a flow path for pressurised fluid from the first and/or second pressurised supply to escape to atmosphere in the case of a structural failure (i.e. a crack).

The servo actuator may include a sleeve. The sleeve may be located within the cavity formed in the actuator housing. The sleeve may be substantially cylindrical in shape. The sleeve may be hollow. The at least one spool, the sleeve and the cavity may be concentric. At least part of the spool may be located inside the sleeve. It may be that each sleeve divides the annular portion of the cavity surrounding the at least one spool into at least two annular zones along a portion of the length of the at least one spool. It may be that the sleeve extends along the majority of the length of the at least one spool. At least part of each spool may be located inside a sleeve. In the case that the actuator includes more than one spool at least a portion of each spool may be located inside a different sleeve. For example, a portion of the first spool may be located inside a first sleeve and a portion of the second spool may be located inside a second sleeve. A portion of each further spool may be located inside a further sleeve.

A spool may be located concentrically with more than one sleeve. A sleeve may be categorised according to its location relative to the spool and any other sleeve within the cavity. An inner sleeve may be located within the cavity such that the outer surface of the spool is adjacent to the inner surface of the inner sleeve. The servo actuator may include at least one inner sleeve. An outer sleeve may be located within the cavity such that the outer surface of the outer spool is adjacent to the inner surface of the actuator housing which defines the cavity. The servo actuator may include an outer sleeve. It may be that an inner sleeve is located between the outer sleeve and the spool. Thus, the at least one spool may be concentric with an inner sleeve, an outer sleeve and the cavity. Including an inner sleeve and an outer sleeve may facilitate mechanically simple designs where pressurised fluid can be redirected in the case of a spool-jam. The inner sleeve may be located within the outer sleeve. In the case that the servo actuator includes more than one spool, a portion of each spool may be located inside a different inner sleeve and a different outer sleeve. At least a portion of the first spool may be located inside a first inner sleeve and a first outer sleeve. At least a portion of the second spool may be located inside a second inner sleeve and a second outer sleeve. At least a portion of each further sleeve may be located within a further inner sleeve and a further outer sleeve.

Each sleeve may include one or more apertures extending through the wall of the sleeve to allow fluid to flow from one side of the sleeve wall to the other. Each sleeve may include a plurality of apertures, spaced apart around the circumference of the sleeve, to allow fluid to flow from one annular zone to another.

Each aperture may be categorised according to the type of internal port with which it is associated. An aperture may be said to be associated with a port if, in use, fluid flows through that aperture to or from the port. Each sleeve may include an inlet aperture associated with an inlet port. Pressurised fluid may flow into an annular zone from the inlet port via the inlet aperture. Each sleeve may include a pair of control apertures, each control aperture being associated with a control port. Fluid may flow between an annular zone and a control port via the control aperture. Each sleeve may include an outlet aperture associated with an outlet port. Fluid may flow out of an annular zone to the outlet port via the outlet aperture. Each sleeve may include a release aperture associated with a release port. Fluid may flow out of an annular zone to a release port via the release aperture in the case of a spool-jam. Each sleeve may include further apertures corresponding to further internal ports. The outer sleeve may include a different number and type of apertures to the inner sleeve. For example, the outer sleeve may include a release aperture in addition to apertures corresponding to each of the ports of the first set. Apertures formed in the outer sleeve will be referred to herein using the prefix outer and apertures formed in the inner sleeve will be referred to herein using the prefix inner. Thus, an outlet aperture formed in the outer sleeve will be referred to as an outer-outlet aperture.

In normal use, the flow path of fluid from the pressurised supply through the cavity may be inlet port, outer-inlet aperture, inner-inlet aperture, inner-control aperture, outer-control aperture, control port. In normal use, the flow path of fluid from an actuator chamber through the cavity may be control port, outer-control aperture, inner-control aperture, inner-outlet aperture, outer-outlet aperture, outlet port.

Following a spool-jam, the flow path of fluid through the cavity from the pressurised supply may be (i) inlet port, outer-inlet aperture, outer-release aperture, release port or (ii) inlet port, outer-inlet aperture, outer-outlet aperture, outlet port. Following a spool-jam, the flow path of fluid through the cavity from an actuator chamber may be (i) control port, outer-control aperture, outer-release aperture, release port or (ii) control port, outer-control aperture, outer-outlet aperture, outlet port.

A sleeve may include a first set of apertures, each aperture corresponding to a port of the first set of internal ports. A sleeve may include a second set of apertures, each aperture corresponding to a port of the second set of internal ports. It may be that not all of the ports of an internal set of ports have a corresponding aperture in each sleeve.

Where the servo actuator includes a first spool associated with the first set of internal ports the servo actuator may include a first inner sleeve and a first outer sleeve, each sleeve containing a set of apertures corresponding to the ports of the first set. Where the servo actuator includes a second spool associated with the second set of internal ports, the servo actuator may include a second inner sleeve and a second outer sleeve, each sleeve containing a set of apertures corresponding to the ports of the second set. Fluid flowing from an inlet port to an outlet port may flow via the apertures on each sleeve associated with those ports.

It may be that the outer surface of the inner sleeve contains a plurality of grooves, for example six grooves. Each groove may be arranged to facilitate the flow of fluid around a portion of the circumference of the inner sleeve. Each groove may be arranged such that when the inner sleeve rotates relative to the outer sleeve the groove forms a flow path between two outer-apertures (i.e. apertures formed in the outer sleeve). A groove may be arranged such that when the inner sleeve rotates relative to the outer sleeve the groove forms a flow path between an outer-outlet aperture and one of the outer-inlet apertures or one of the outer-control apertures. A groove may be arranged such that when the inner sleeve rotates relative to the outer sleeve the groove forms a flow path between an outer-release aperture and one of the outer-inlet apertures or one of the outer-control apertures. Providing the grooves in the outer surface of the inner sleeve may allow fluid to flow from the pressurised supply, and the control ports, to return in the case of a spool-jam. Thus arrangements of the spools, sleeves and grooves in accordance with the present invention may provide a simple and robust way of reducing the risk of in-service failure of the servo actuator following a spool-jam in one of the spools.

The at least one spool may be located in the cavity such that there is substantially no gap between the outer surface of spool where the channel is not present and the inner surface of the inner sleeve where the inner-apertures are not present. The inner sleeve may be located in the cavity such that there is substantially no gap between the outer surface of the inner sleeve where the inner-apertures and grooves are not present and the inner surface of the outer sleeve where the outer-apertures are not present. The outer sleeve may be located in the cavity such that there is substantially no gap between the outer surface of the outer sleeve where the outer-apertures are not present and the inner surface of the actuator housing where the internal ports are not present. The majority of the surface of the inner sleeve may be in contact, as herein defined, with the inner surface of the outer sleeve. The majority of the surface of the outer sleeve may be in contact, as herein defined, with the inner surface of the actuator housing. "in contact" as herein defined means that any gap between the two components in question is small enough that internal leakage of fluid is less than 5% of the flow through the valve. Therefore fluid flow around the spool, other than via the grooves and/or channels, may be prevented. Thus, contact between the outer surface of a first component and the inner surface of a second component may be defined as two surfaces being sufficiently close together to prevent significant flow between the inner surface and the outer surface. For example, the clearance between the spool and the inner surface of the inner sleeve may be between 5 μm and 15 μm, or less than 10 μm. In this way precise control of the fluid flow through the valve is achievable, as the amount of flow is the result of the degree of alignment between the grooves and/or channels and the fluid inlet/outlet.

Each sleeve may be mounted for movement relative to the actuator housing. Each sleeve may be mounted for movement relative to any other sleeve, if present, and the at least one spool. The outer sleeve may be mounted for movement relative to the inner sleeve. Mounting each sleeve for independent movement may allow the sleeve to play a role in controlling the flow of fluid (as well as or instead of the spool) through the servo actuator, thereby increasing the accuracy of movement of the actuator member. For example, the outer sleeve may form part of a feedback system. Each sleeve may be mounted for rotational movement.

The servo actuator may include a locking member. The locking member may be biased towards a locked position in which the member prevents the inner sleeve moving relative to the outer sleeve. Thus, when the locking member is in the locked position the inner sleeve rotates with the outer sleeve. The locking member may be biased by a resilient member, for example a helical spring or leaf spring. The properties of the resilient member may be such that, when the torque on the inner sleeve exceeds a threshold value, the bias is overcome and the locking member moves to an open position. It may be that, when the locking member is in the open position, the inner sleeve can rotate relative to the outer sleeve. The servo actuator may include a plurality of locking members, for example three locking members, equally spaced around the circumference of the inner and/or outer sleeve.

It may be that during normal operation the locking member is in the locked position such that the inner sleeve and outer sleeve move together. Thus, the inner sleeve and the outer sleeve may be referred to as being in a normal configuration when the locking member is in the locked position. It may be that the force necessary to move the locking member to the open position is generated by the spool-jam itself, for example by the spool jamming on the inner sleeve and thereby exerting a torque on the inner sleeve. Advantageously this may allow the servo actuator to react quickly to a spool-jam without the need for additional feedback systems and/or user intervention. The inner sleeve and the outer sleeve may be referred to as being in a spool-jam configuration when the locking member is in the open position.

The internal ports may be spaced around the circumference of the at least one spool. The order of the ports around the circumference of the spool may be the same for each set. That is to say, corresponding ports may be in the same position relative to the other ports in each set. Release ports associated with one spool may be in the same relative position to the ports of a set associated with that spool as release ports associated with another spool. The order of ports around the circumference of the spool may be as follows: inlet port, release port, B-control port, outlet port, A-control port, release port, inlet port, release port, B-control port, outlet port, A-control port, release port.

The internal ports of each set may be grouped separately from the internal ports of any other set. Each set may be spaced apart from any other set along the longitudinal axis of the spool. Each set may have the same number of ports in each category and each port may be in substantially the same position relative to the other ports. The configuration of internal ports in the second set may be substantially the same as the configuration of internal ports in the first set. The configuration of internal ports in the second set may be identical to the configuration of internal ports in the first set. The release ports associated with each spool may be similarly arranged with respect to the release ports associated with any other spool.

Advantageously, the arrangements described above may simplify the layout of the grooves on the spool and the control movements required.

The servo actuator may include a motor. The servo actuator may be a Direct Drive Valve (DDV). The motor may include a rotor and a stator. The first spool may be located on a first side of the motor. The second spool may be located on a second, different, side of the motor. The internal ports associated with each spool may therefore be located on different sides of the motor. The motor may include a plurality of independently energisable coils. For example, the motor may include two, three, four or more independently energisable coils. The motor may include a plurality of motor magnets. For example, the motor may include two, three, four or more motor magnets. Including more than one independently energisable coil may allow the servo actuator motor to continue operating in the case of a coil-failure thereby increasing the reliability of the servo actuator and increasing the suitability of the servo actuator for safety-critical applications.

The servo actuator may be controlled with a mechanical input. The mechanical input may be connected to the spool. The mechanical input may be used in conjunction with a mechanical feedback. The mechanical feedback may be configured so as to limit the displacement of the mechanical input to set the maximum operating velocity.

The servo actuator may include a feedback system. The feedback system may alter the behaviour of the servo actuator in dependence on the movement of the actuator member. The feedback system may be a mechanical feedback system. The mechanical feedback system may include a mechanical linkage connecting the at least one outer sleeve to the actuator member. The mechanical linkage may be arranged to control the movement of the outer sleeve relative to the actuator housing in response to movement of the actuator member. Using the outer sleeve as part of the feedback system may allow for more precise control of the movement whilst minimising the increase in size of the servo actuator associated with the inclusion of a feedback system. The feedback system may be an electrical feedback system. The electrical feedback system may include a sensor and a controller arranged to control the movement of the at least one spool in response to movement of the actuator member. Such electrical feedback systems are well known and will not be discussed further here.

The servo actuator may include a spool feedback system arranged to control the position of the at least one spool in response to a user input. The spool feedback system may include a Hall Effect sensor. The spool feedback system may include a sensor rotor including a magnet. The spool feedback system may include a controller. The sensor rotor may be coaxially located with the at least one spool. The Hall Effect sensor may be located within the actuator housing in the region of the sensor rotor. Thus, the fluctuating magnetic field generated by the movement of the sensor rotor magnet may produce a varying output from the Hall Sensor. The controller may vary the current to the motor in response to the output of the Hall Sensor.

The servo actuator may be a rotary actuator. The actuator member may be mounted for rotation relative to the actuator housing.

The servo actuator may be a linear actuator. The actuator member may be mounted for translational movement relative to the actuator housing. The actuator member may be mounted to translate along an axis of movement. The longitudinal axis of the at least one spool may be substantially parallel to the axis of movement. The longitudinal axis of the at least one spool may lie across, for example perpendicular to, the axis of movement. Arranging the longitudinal axis of the spool across the axis of movement of the may facilitate the design of mechanical feedback mechanisms.

The servo actuator may be arranged for connection to a pressurised supply. Each inlet port may be arranged such that, in use, the inlet port is in fluid communication with the pressurised supply. The servo actuator may be arranged for connection to a return. The return may be pressurised at a lower level than the pressurised supply. Each outlet port may be arranged such that, in use, the outlet port is in fluid communication with the return. Each release port may be arranged such that, in use, the release port s in fluid communication with the return.

The actuator member may have a range of movement of 50 mm to 200 mm. The servo actuator may be capable of producing in the range of 1 kN to 100 kN of force. The actuator arm may be capable of moving at frequencies in the range of 1 Hz to 50 Hz, for example 10 Hz to 20 Hz.

The spool may have a range of movement of between +/−3 degrees to +/−60 degrees. The mass of the servo actuator may be in the range of 1 kg to 30 kg, for example between 5 kg and 20 kg.

The actuator housing may be made from steel. The actuator housing may be made from titanium.

The servo actuator may be a hydraulic servo actuator.

According to a second aspect of the invention there is provided an aircraft including a servo actuator in accordance with the first aspect. The servo actuator may be suitable for use in aerospace applications. The servo actuator may be suitable for use in safety-critical aerospace applications. The servo actuator may be arranged to control the movement of a flight control surface of the aircraft. The actuator member may be connected, for example directly connected, to a flight control surface of the aircraft, for example in response to an electrical or mechanical control signal generated by the pilot. The aircraft may be a fixed wing aircraft. The aircraft may be a rotorcraft, for example a helicopter. The actuator member may be arranged to alter the pitch of a helicopter rotor blade. The aircraft may be an Unmanned Air Vehicle (UAV).

According to an third aspect of the invention, there is provided a computer-readable medium having computer-executable instructions adapted to cause a 3D printer to print an actuator housing suitable for use as the actuator housing of the first aspect. It may be that the actuator housing, for example the center gland, including the internal ports of the first and second sets, and the cavity in which the at least one spool is located is formed as a single component using 3D printing. The computer-readable medium may also include instructions adapted to cause a 3D printer to print at least one spool suitable for use as the spool of the first aspect. The computer-readable medium may also include instructions adapted to cause a 3D printer to print any other component in accordance with the first aspect. 3D printing may allow the commercial production of servo actuators in accordance with the present invention.

According to a fourth aspect of the invention, there is provided a method of controlling the motion of an actuator member using a servo actuator comprising an actuator housing, in which a portion of the actuator member is housed, at least one spool located in a cavity formed within the actuator housing, a first set of internal ports formed within the actuator housing, the first set of internal ports including a first inlet port, a first outlet port and a first pair of control ports and a second set of internal ports formed within the actuator housing, the second set of ports comprising a second inlet port, a second outlet port and a second pair of control ports, the method comprising the steps of: connecting the first inlet port to a first pressurised supply; connecting the second inlet port to a second pressurised supply; and moving the at least one spool to alter the flow path of (i) fluid from the first pressurised supply through the first set of internal ports and (ii) fluid from the second pressurised supply through the second set of internal ports to control the movement of the actuator member.

In the case that the servo actuator further comprises a locking member, the method may comprise the step of moving the locking member from a locking position in which the locking member locks the at least one inner sleeve into position relative to the at least one outer sleeve, to an open position in which the inner sleeve can move relative to the outer sleeve in response to a spool-jam. Allowing the outer sleeve to move relative to the inner sleeve following a spool-jam may facilitate servo actuator designs in which pressurised fluid escapes to return in the case of a spool-jam. For example, when the outer spool is displaced relative to the inner spool, it may be that the grooves on the outer surface of the inner spool (if present) can be aligned with the outer-apertures to form a flow path from an inlet or control port to an outlet port or release port.

The method may include a step of moving the locking mechanism between the locked position and the open position in response to a torque on the inner and/or outer sleeve exceeding a threshold value. Thus, it may be that the locking member moves between the two configurations without the need for any user intervention and/or feedback.

The method may further include producing the actuator housing using an additive manufacturing process. Using an additive manufacturing process to produce the actuator housing may allow for the commercial production of an actuator housing containing two sets of internal ports.

It may be that the actuator member is connected to a flight control surface of an aircraft, for example a helicopter, such that the servo actuator can be used to move the flight control surface. Thus, in a further aspect, the present invention also provides a method of controlling the movement of a flight control surface.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
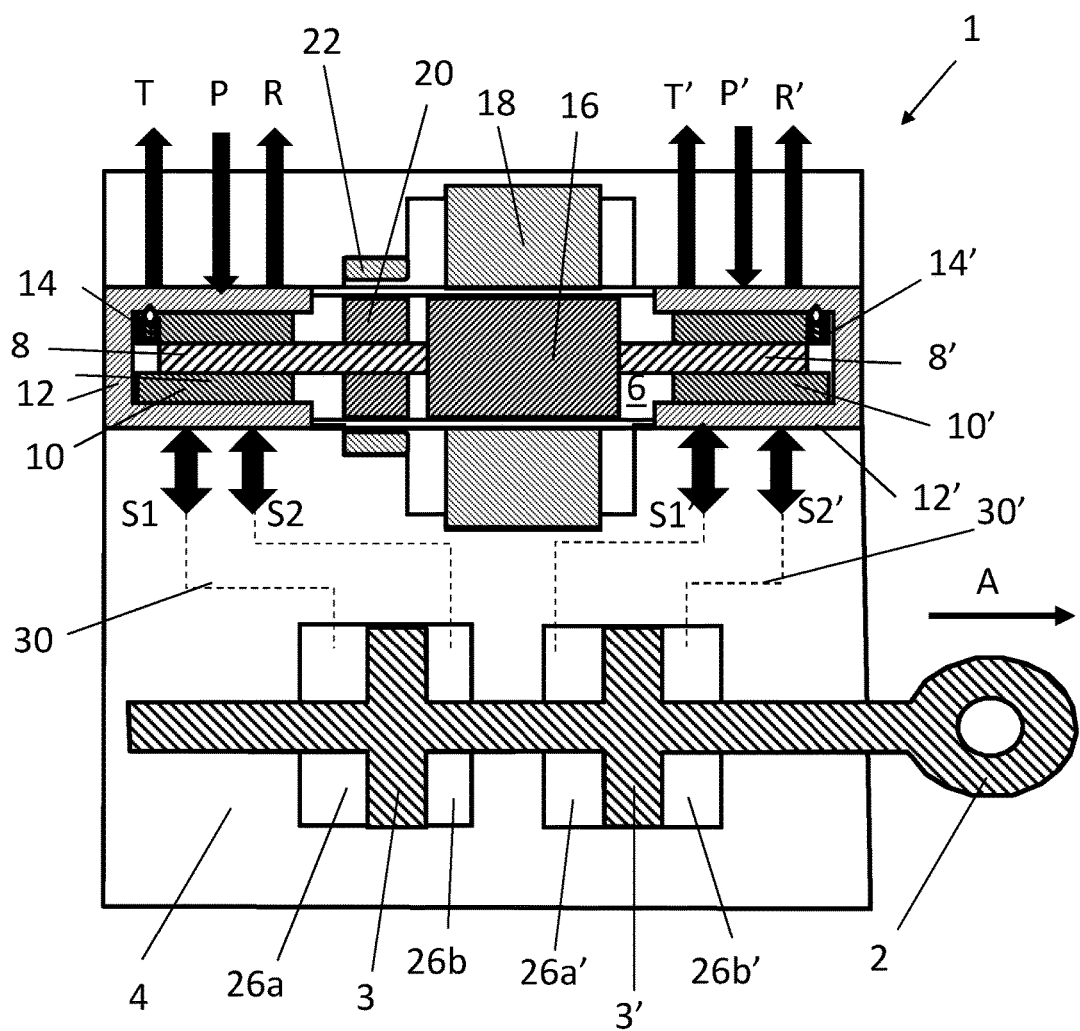
FIG. 1 shows a schematic cross-sectional view of a servo actuator according to a first embodiment of the invention.

FIG. 1 shows a schematic cross-sectional view of a servo actuator 1 in accordance with a first example embodiment. A linear actuator arm 2 is located partially within an actuator housing 4. A spool 8 is located within a cylindrical cavity 6 and is connected to the left-hand side of a motor rotor 16 in FIG. 1. The motor rotor 16 is concentrically located within the cylindrical cavity 6. A motor stator 18 is connected to the inner surface of the actuator housing 4 which defines the cavity 6 and the stator 18 extends around the rotor 16. A sensor stator 22 is also connected to the inner surface of the actuator housing 4 via the motor stator 18. A sensor rotor 20 is connected to the spool 8.

Figure 2:
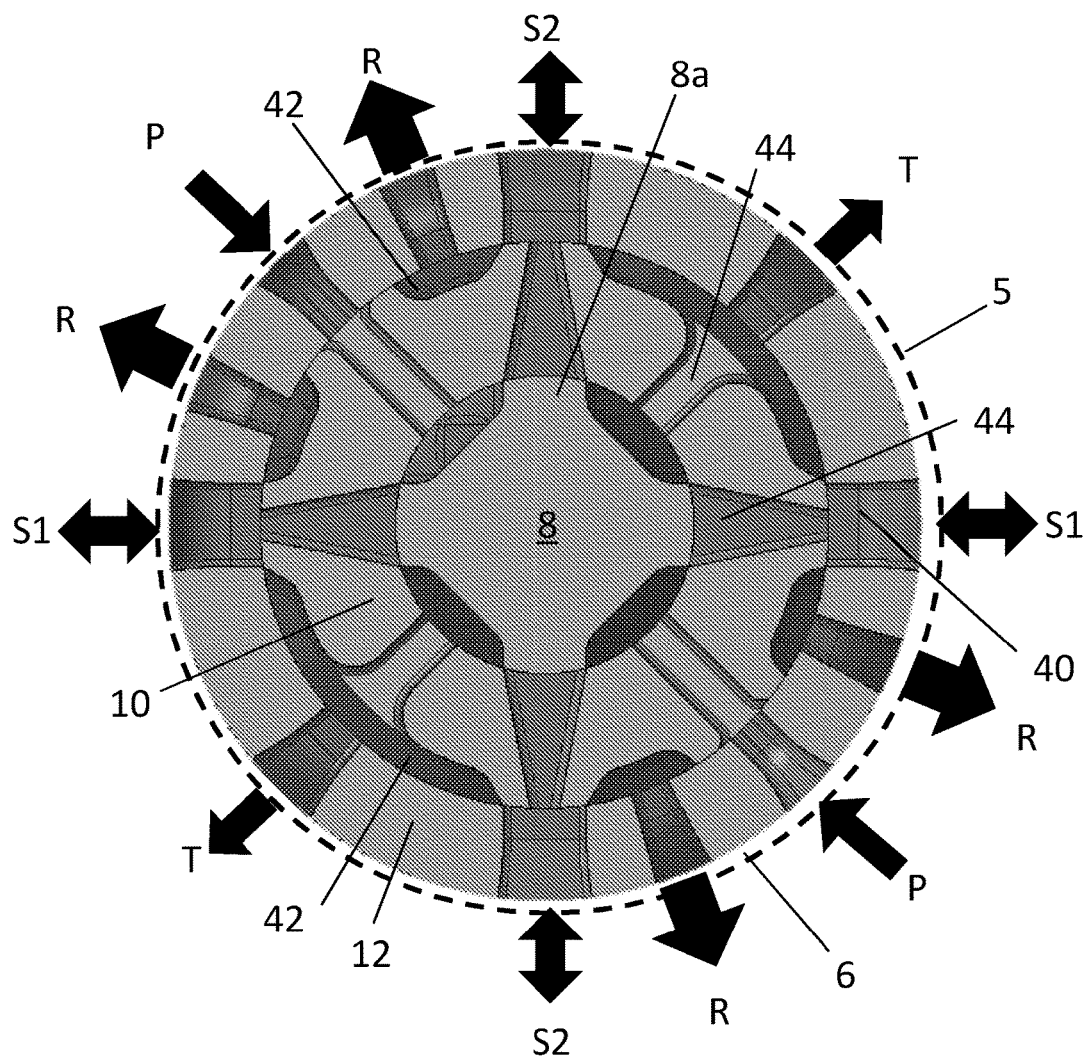
FIG. 2 shows a schematic cross-sectional view of part of a spool, inner sleeve and outer sleeve of the first embodiment.

A set of internal ports including inlet ports P, outlet ports T and control ports S1, S2 are formed in the inner surface of the actuator housing 4 which defines the extent of cavity 6 in the region of the left-hand spool 8. The internal ports are denoted by arrows in FIG. 1, and for clarity are shown spaced along the longitudinal axis of the spool 8 in FIG. 1. For clarity, not all the internal ports are shown in FIG. 1, the full set of ports is shown in FIG. 2. Release ports R are also formed in the inner surface of the actuator housing 4. Flow galleries (not shown) within the actuator housing 4 connect each inlet port P with a pressurised supply (not shown). Flow galleries (not shown) within the actuator housing 4 connect each outlet port T and release port R with a return (not shown). A cylindrical inner sleeve 10 is shown in cross-section in FIG. 1 and extends around the left-hand spool 8. A cylindrical outer sleeve 12 extends around the inner sleeve 10. The spool 8 is concentrically located within the inner sleeve 10 and outer sleeve 12 and cavity 6. Each sleeve 10, 12 extends along the length of the spool 8. A locking assembly 14 is located on the outer circumference of the inner sleeve 10 and extends between the inner and outer sleeves 10, 12. The structure of the inner sleeve 10, and outer sleeve 12 is shown in more detail in FIG. 2. The structure of the locking assembly 14 is shown in more detail in FIG. 3. A second spool 8' is located on the right-hand side of the motor rotor 16. A second set of ports P', T', R', S1' and S2' are formed in the inner surface of the actuator housing 4 which defines the extent of cavity 6 in the region of the right-hand spool 8'. A second inner sleeve 10', outer sleeve 12', and locking assembly 14' are associated with the right-hand spool 8'. A fluid membrane separates motor stator 18 and sensor stator 22 from the fluid cavity 6.

The actuator arm 2 includes a piston 3 which is concentric with and extends radially outward from the longitudinal axis of the arm 2. The piston 3 extends across a cavity 26 formed within the actuator housing 4, thereby separating the cavity 26 into two regions 26a and 26b. Flow galleries 30 denoted by dashed lines in FIG. 1 connect control port S1 with region 26a and control port S2 with region 26b of the cavity 26. A second piston 3' extends radially from the actuator arm 2 and similarly divides a second chamber 26' which is connected with the second set of control ports S1' and S2'. A mechanical linkage (not shown) connects each outer sleeve 12 with the actuator arm 2. For clarity, the axis of movement of the actuator arm and longitudinal axis of the spool 8 have been shown as being parallel in the schematic FIG. 2. However, in practice having the axis of movement of the actuator arm 2 perpendicular to the longitudinal axis of the spool 8 greatly simplifies the mechanical linkage connecting the outer sleeve 12, 12' and arm 2.

The actuator housing 4 is made of steel and is produced using 3D printing. The spool 8 is also formed within the cavity.

In normal use, when the spool is rotated away from the null position, fluid flowing from the pressurised supply (not shown) via inlet ports P, P', spools 8, 8' and control ports S1, S1' to regions 26a, 26a' leads to an increase in pressure on the left-hand side of each piston 3, 3'. This increase in pressure moves the actuator arm 2 in a first direction, labelled A in FIG. 1. Movement of the piston pushes fluid out of the right-hand side regions 26b, 26b' and out of the outlet ports T via the spools 8, 8' and control ports S2, S2'. When the spool is rotated in the opposite direction, fluid flowing from the pressurised supply (not shown) via inlet ports P, P', spools 8, 8' and control ports S2, S2' to regions 26b, 26b' leads to an increase in pressure on the right-hand side of each piston 3, 3'. This increase in pressure moves the actuator arm 2 in a second direction, opposite to direction A in FIG. 1. Movement of the piston pushes fluid out of the left-hand side regions 26a, 26a' and out of the outlet ports T via the spools 8, 8' and control ports S1, S1'.

FIG. 2 shows a close-up cross-sectional schematic view of the spool 8, inner sleeve 10, and outer sleeve 12. The inner surface of the actuator housing 4 which defines the extent of cavity 6 is denoted by a dashed line 5 in FIG. 2. The cylindrical spool 8, cylindrical inner sleeve 10 and cylindrical outer sleeve 12 are concentrically located within the cylindrical cavity 6. The spool 8 is located inside the inner sleeve 10 which is in turn located inside the outer sleeve 12. The inner surface of the actuator housing 4 includes two inlet ports P (located at approx. the north-west and south-east positions on the circumference of the cylindrical cavity 6 in FIG. 2) and two pairs of control ports S1, S2 (having control ports located at approx. the north, south, west and east positions in FIG. 2). Including two inlet ports P located opposite each other allows the forces generated by the high-pressure fluid entering the cavity 6 via the ports P to balance out, thereby maintaining the spool 8 in a central position within the cavity 6. The inner surface of the actuator housing 4 also includes two outlet ports T (located at approx. the north-east and south-west positions in FIG. 2) and four release ports R (two release ports R being located either side of each inlet port P). The order of the ports clockwise around the circumference of the cylindrical cavity 6 is as follows: control port S2, outlet port T, control port S1, release port R, inlet port P, release port R, control port S2, outlet port T, control port S1, release port R, inlet port R, release port R. The outer sleeve 10 contains twelve apertures 40 extending through the wall of the sleeve. Each aperture 40 on the outer sleeve 12 is aligned with a different internal port (P, R, T, S1 or S2) when the outer sleeve 12 is in the null position as shown in FIG. 2. The inner sleeve 10 includes eight apertures 44 extending through the wall of the inner sleeve. When the inner sleeve 10 is in the null position as shown in FIG. 2 an aperture 44 is aligned with each inlet ports P, first and second control ports S1, S2 and outlet ports T. No aperture on the inner sleeve is associated with the release ports R. The inner sleeve 10 also includes six grooves 42 extending circumferentially over a portion of its outer surface. Each groove 42 is aligned with either an outlet port T or release port R when the inner sleeve 10 is in the null position. Two of the six grooves 42 (those grooves associated with the outlet ports T) are subtended by an aperture 44. The spool 8 comprises four lands 8a each separated by 90 degrees. In the null position, the lands 8a are aligned with and close off the apertures 44 of the inner sleeve 10 associated with the control ports S1, S2.

Figure 3:
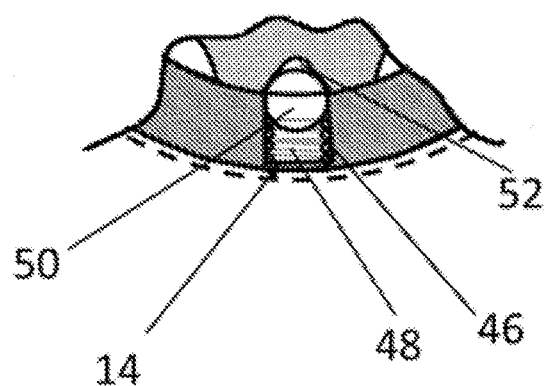
FIG. 3 shows a schematic view of the locking mechanism of a servo actuator in accordance with the first embodiment.

FIG. 3 shows a close-up view of the locking mechanism 14 which is located in a recess 46 formed in the bottom inner surface of outer sleeve 12. The locking mechanism 14 comprises a helical spring 48 and ball bearing 50. In the locking position as shown in FIG. 3 the spring 48 is located in the recess 46 and a portion of the ball bearing 50 protrudes beyond the inner surface of outer sleeve 12 and into a corresponding recess 52 formed in the bottom outer surface of inner sleeve 10. Thus, in the locking position the ball bearing 50 locks the inner sleeve 10 into position relative to the outer sleeve 12.

In normal use, rotation of the spool 8 clockwise uncovers the apertures 44 in the inner sleeve associated with the control ports S1, S2 creating a flow path between (i) each inlet port P and a control port S2 and (ii) an outlet port T and the other port of each pair of control ports S1. Rotation of the spool 8 anticlockwise creates a flow bath between (i) each inlet port P and control port S1 and (ii) an outlet port T and the control port S2. Thus, rotation of the spool 8 controls the flow of fluid to and from the actuator chambers 26. Movement of the actuator arm 2 as a result of fluid flow into the actuator chambers 26, 26' is fed back to the outer sleeve 12 via the mechanical linkage (not shown). The mechanical linkage rotates the outer sleeve 12, and the inner sleeve 10 which is locked thereto, about the spool 8 to close-off the flow when the actuator arm 2 reaches the desired position.

In the case of the spool 8 jamming against the inner sleeve 10, the torque produced by the inner sleeve 10 on the ball bearing 50 of the locking mechanism 14 overcomes the bias of spring 48 and therefore the inner sleeve 10 will move with the spool 8 relative to the outer sleeve 12. The geometry of the grooves 42 in the outer surface of the spools is such that rotation of the inner sleeve 10 relative to the outer sleeve 12 creates flow paths via the grooves 42 between each inlet port P and a release port R and between each control port S1, S2 and an outlet port T or release port R. Consequently, when the bias of the locking mechanism 14 is overcome as a result of a jam between the spool 8 and the inner sleeve 10 the pressurised supply and the contents of actuator chambers 26 are exhausted to return via the release ports R and/or outlet ports T. The actuator cavity 26 therefore exerts no further force on the actuator arm 2 which continues to be controlled by the other spool 8' via actuator cavity 26'. Servo actuators in accordance with the present embodiment therefore facilitate the continued operation of the actuator arm in the event that one of the spools 8 becomes jammed. Consequently servo actuators in accordance with the present embodiment have a reduced risk of in-service failure which renders them suitable for safety-critical applications. Moreover, the inner and outer sleeves and locking mechanism as described above provide a mechanically simple and robust way of ensuring that pressurised fluid escapes to atmosphere without impacting on the functioning of the servo actuator.

Providing both spools along with the associated flow galleries and internal ports within the actuator housing may reduce the size of the servo actuator compared to servo actuator assemblies having two separated hydraulic systems.

Dashed line 5 has been spaced apart from the outer surface of the inner sleeve 12 in FIG. 2 for clarity. In the example embodiment there is a gap of around 10 μm between the inner surface of the actuator housing 4 and the outer surface of the outer sleeve 12, and between the outer surface of the spool 8 and the inner surface of the inner sleeve 10.

Figure 4A:
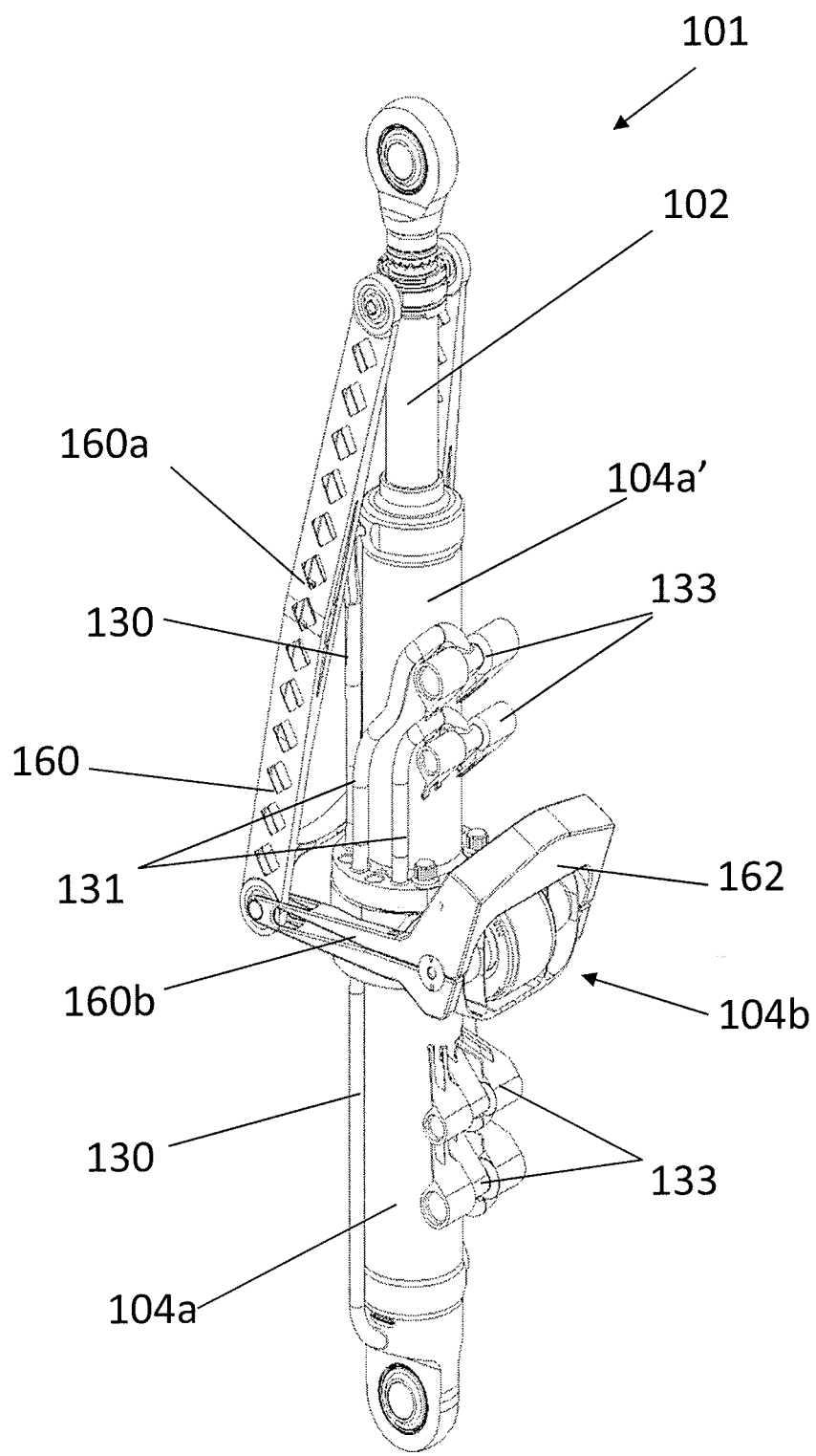
FIGS. 4*a* and 4*b* show external and internal cross-sectional views respectively of a servo actuator in accordance with a second example embodiment.

FIG. 4a shows an exterior view of a servo actuator 101 in accordance with a second example embodiment. Only those aspects of the present embodiment which differ from the first embodiment will be discussed here. Like reference numerals have been used for like components. The servo actuator housing 104 of the second embodiment comprises two elongate jack bodies 104a, 104a' which surround the actuator arm 102. Located between the jack bodies 104a, 104a' is a center gland 104b. The cavity, spool, motor and internal ports (not visible in FIG. 4a) are located and/or formed within the center gland 104b. A portion of each of the flow galleries connecting internal ports with the actuator cavities 126 (see FIG. 4b) is formed in a portion of the housing having a tube-like structure 131, each tube 131 extending along the outside surface of a jack body 104a, 104a'. Connection points 133 for connection with the pressurised supplies (not shown) and return (not shown) are located on the outside surface of each of the jack bodies 104a, 104a'. Tube-like structures 135 containing flow galleries linking the connection points 133 and internal ports (not shown) also extend along the outer surface of the jack bodies 104a, 104a'. A mechanical linkage 160 which comprises first and second linking members 160a, 160b extends between the distal end of the actuator arm 204 and the center gland 104b. The linking members 160a, 160b are pivotally connected to each other at one end and to the housing 104 at the other end. A handle 162 is integrally formed with the second member 160b which is connected to the center gland 104a. The mechanical linkage 160 forms part of a mechanical feedback system which rotates the outer sleeve (not shown) in response to movement of the actuator arm 102. Each of the jack bodies 104a, 104a' and center gland 104b are separately formed using a 3D printing process before being bolted together.

Figure 4B:
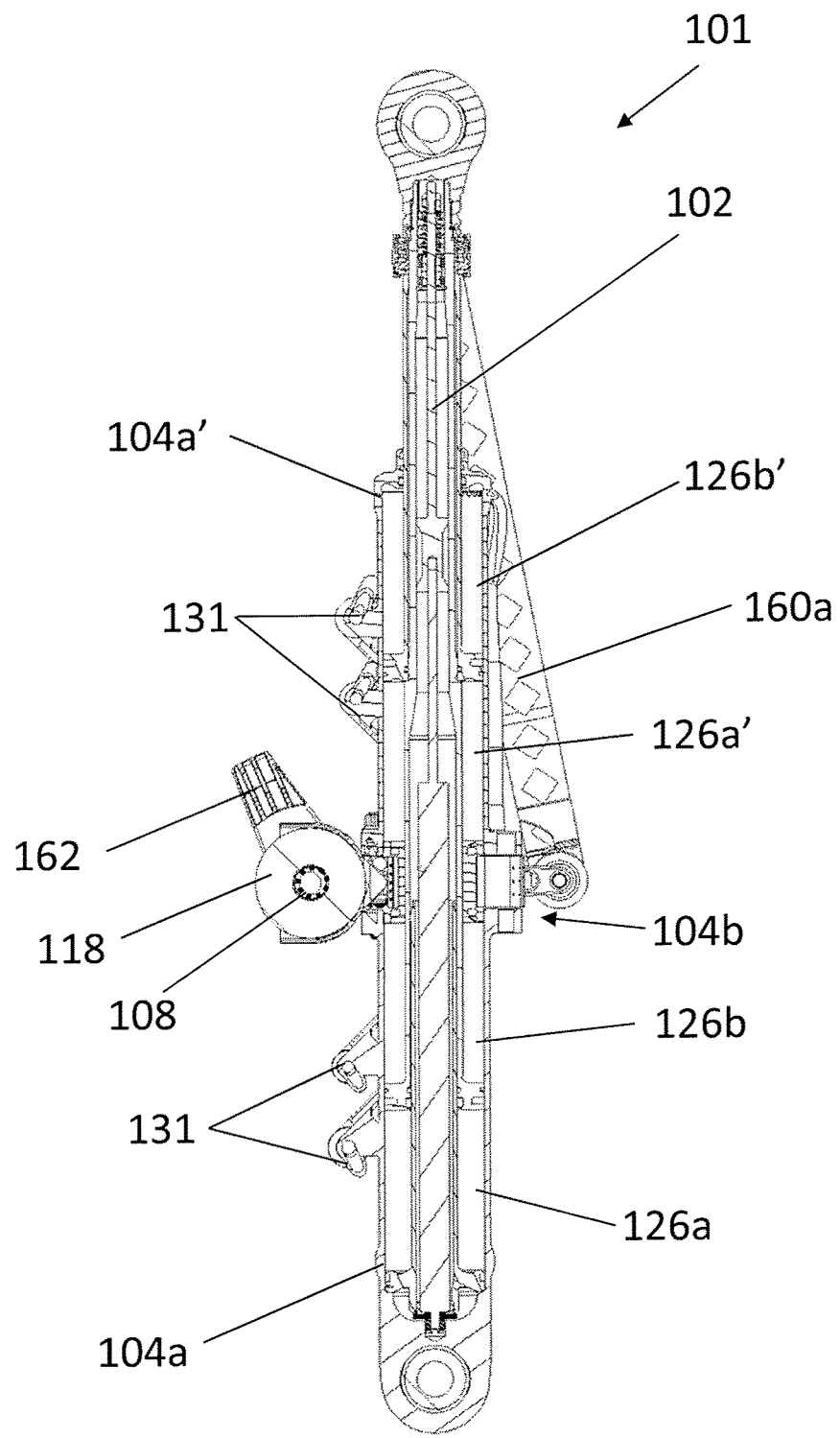

FIG. 4b shows a cross-sectional view of the servo actuator 102 of the second embodiment. Actuator cavities 126 associated with the first set of internal ports (not shown) are formed in one jack body 104a and actuator chambers 126' associated with the second set of internal ports (not shown) are formed in the other jack body 104a'.

Figure 5:
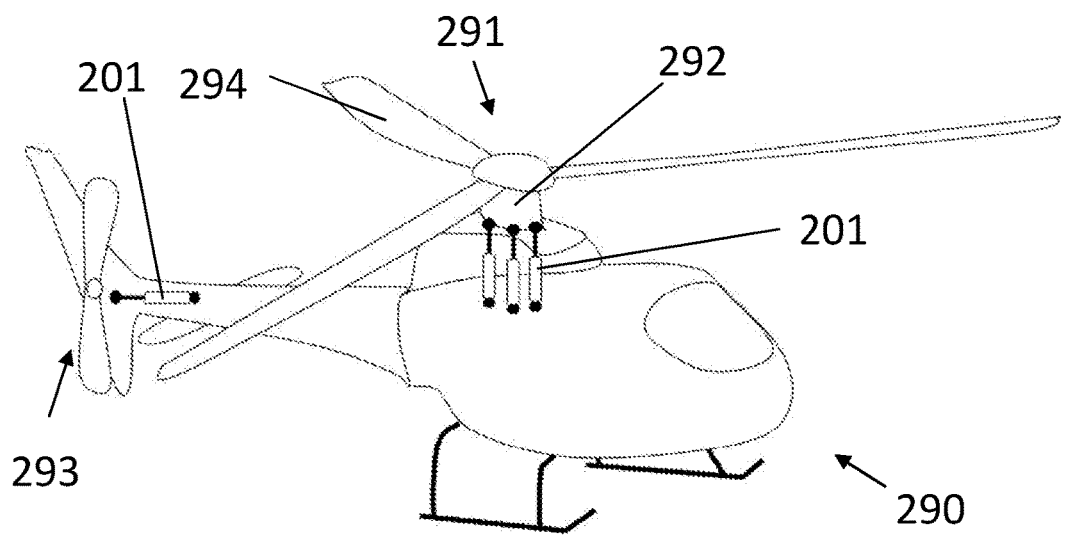
FIG. 5 shows a schematic view of a helicopter including a plurality of servo actuators in accordance with a third embodiment.

FIG. 5 shows a helicopter 290 including four servo actuators 201 in accordance with a third example embodiment of the invention. The helicopter includes a main rotor 291 having three rotor blades 294 connected to a rotor hub 292 which includes a swash plate (not shown). The helicopter also includes a tail rotor 293. The actuator arm 202 of each of three servo actuators 201 is attached to a different point on the swash plate. Thus, servo actuators 201 may be used to tilt and move the swash plate and thereby the rotor blades 294 in response to control commands from the flight crew. A fourth actuator 201 is connected to the tail rotor 293. The use of actuators to control the motion of helicopter rotor blades is well known and will not be discussed further here.

Whilst the present invention has been described and illustrated with reference to particular embodiments, it will be appreciated by those of ordinary skill in the art that the invention lends itself to many different variations not specifically illustrated herein. By way of example only, certain possible variations will now be described. While the invention has been discussed above with reference to a servo actuator including two spools, it will be appreciated that many of the features described above may be advantageously incorporated in a servo actuator having a single spool, or more than two spools. It will also be appreciated that a single sleeve may be provided. Whilst the spool as described above is mounted for rotational movement, it will be appreciated that the spool may be mounted for translational movement. While the locking mechanism described in the above embodiments is attached to the outer sleeve and protrudes into a recess formed in the inner sleeve, it will be appreciated that the locking mechanism may be attached to the inner sleeve and protrude into a recess formed in the outer sleeve. It will also be appreciated that the helical spring of the locking mechanism may be replaced by a leaf spring. Similarly a plurality of locking members, for example three locking members may be provided spaced around the circumference of the sleeves.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A servo actuator comprising:
an actuator housing;
an actuator member located at least partially within the actuator housing;
at least one spool located in a cavity formed within the actuator housing;
a first set of internal ports formed within the actuator housing, the first set of internal ports including a first inlet port, a first outlet port and a first pair of control ports, the first inlet port being arranged for connection to a first pressurised supply;
a second set of internal ports formed within the actuator housing, the second set of ports comprising a second inlet port, a second outlet port and a second pair of control ports, the second inlet port being arranged for connection to a second pressurised supply;

wherein the actuator housing includes a center gland, and the first set of internal ports and second set of internal ports are formed in the center gland; and wherein, in use, movement of the at least one spool alters a flow path of fluid through the first and second set of internal ports to control the movement of the actuator member.

2. A servo actuator according to claim 1, wherein the at least one spool is mounted for axial rotation.

3. A servo actuator according to claim 1, wherein the servo actuator includes at least two spools, each spool being located in a cavity formed within the actuator housing and wherein movement of the first spool alters the flow of fluid through the first set of internal ports and movement of the second spool alters the flow of fluid through the second set of internal ports.

4. A servo actuator according to claim 3, wherein each of the first and second spools is mounted for independent movement with respect to the other of the first and second spools.

5. A servo actuator according to claim 1, wherein the servo actuator includes at least one inner sleeve located in the cavity such that the outer surface of the spool is adjacent to the inner surface of the inner sleeve.

6. A servo actuator according to claim 5, wherein the servo actuator includes at least one outer sleeve located in the cavity such that the outer surface of the outer sleeve is adjacent to the inner surface of the actuator housing which defines the cavity.

7. A servo actuator according to claim 6, wherein the at least one outer sleeve and the at least one inner sleeve are mounted for movement relative to the actuator housing.

8. A servo actuator according to claim 7, wherein the servo actuator includes a locking member biased towards a locked position in which the member prevents the inner sleeve moving relative to the outer sleeve.

9. A servo actuator according to claim 8, wherein the servo actuator includes a mechanical linkage arranged to move the at least one outer sleeve in response to a movement of the actuator member.

10. A servo actuator according to claim 1, wherein the actuating member has an axis of movement and the longitudinal axis of the at least one spool lies across the axis of movement of the actuator member.

11. An aircraft including a servo actuator according to claim claim 1.

12. An aircraft according to claim 11, wherein the aircraft is a helicopter.

13. A method of controlling the motion of an actuator member of a servo actuator, the servo actuator comprising:
an actuator housing, in which a portion of the actuator member is housed;
at least one spool located in a cavity formed within the actuator housing;
a first set of internal ports formed within the actuator housing, the first set of internal ports including a first inlet port, a first outlet port and a first pair of control ports; and
a second set of internal ports formed within the actuator housing, the second set of ports comprising a second inlet port, a second outlet port and a second pair of control ports; and wherein the actuator housing includes a center gland, and the first set of internal ports and second set of internal ports are formed in the center gland;
the method comprising the steps of:
connecting the first inlet port to a first pressurised supply;
connecting the second inlet port to a second pressurised supply; and
moving the at least one spool to alter a flow path of (i) fluid from the first pressurised supply through the first set of internal ports and (ii) fluid from the second pressurised supply through the second set of internal ports to control the movement of the actuator member.

14. A method of controlling the motion of an actuator member of a servo actuator according to claim 13, the servo actuator further comprising at least one inner sleeve located in the cavity such that the outer surface of the spool is adjacent to the inner surface of the at least one inner sleeve, at least one outer sleeve located in the cavity such that the outer surface of the at least one outer sleeve is adjacent to the inner surface of the actuator housing which defines the cavity and a locking member, wherein the method comprises the step of moving the locking member from a locking position in which the locking member locks the at least one inner sleeve into position relative to the at least one outer sleeve, to an open position in which the at least one inner sleeve can move relative to the at least one outer sleeve in response to a spool-jam.

15. A servo actuator comprising:
an actuator housing;
an actuator member located at least partially within the actuator housing;
at least one spool located in a cavity formed within the actuator housing;
a first set of internal ports formed within the actuator housing, the first set of internal ports including a first inlet port, a first outlet port and a first pair of control ports, the first inlet port being arranged for connection to a first pressurised supply;
a second set of internal ports formed within the actuator housing, the second set of ports comprising a second inlet port, a second outlet port and a second pair of control ports, the second inlet port being arranged for connection to a second pressurised supply;
at least one inner sleeve located in the cavity such that the outer surface of the spool is adjacent to the inner surface of the inner sleeve;
at least one outer sleeve located in the cavity such that the outer surface of the outer sleeve is adjacent to the inner surface of the actuator housing which defines the cavity,
each of the at least one inner sleeve and the at least one outer sleeve being mounted for movement relative to the actuator housing;
a locking member biased towards a locked position in which the member prevents the inner sleeve moving relative to the outer sleeve;
a mechanical linkage arranged to move the at least one outer sleeve in response to a movement of the actuator member; and
wherein, in use, movement of the at least one spool alters a flow path of fluid through the first and second set of internal ports to control the movement of the actuator member.

* * * * *